(12) United States Patent
Higashino

(10) Patent No.: US 8,199,423 B2
(45) Date of Patent: Jun. 12, 2012

(54) INFORMATION STORAGE APPARATUS, METHOD FOR CORRECTING FEED PITCH OF READ/WRITE HEAD, AND METHOD FOR FORMING SERVO PATTERN

(75) Inventor: Yoshinari Higashino, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 161 days.

(21) Appl. No.: 12/687,750

(22) Filed: Jan. 14, 2010

(65) Prior Publication Data

US 2010/0177432 A1 Jul. 15, 2010

(30) Foreign Application Priority Data

Jan. 15, 2009 (JP) ................... 2009-006859

(51) Int. Cl.
*G11B 21/02* (2006.01)
*G11B 5/09* (2006.01)
*G11B 5/596* (2006.01)

(52) U.S. Cl. .................. 360/75; 360/51; 360/77.07

(58) Field of Classification Search ................ None
See application file for complete search history.

(56) References Cited

U.S. PATENT DOCUMENTS 5,668,679 A 9/1997 Swearingen et al.
7,145,744 B1 12/2006 Clawson et al.
7,477,472 B2 * 1/2009 Sado et al. ................ 360/75
2006/0103967 A1 * 5/2006 Kim et al. ................ 360/75
2007/0047132 A1 * 3/2007 Sado et al. ............... 360/77.01

FOREIGN PATENT DOCUMENTS

JP 61-59671 3/1986
JP 2008-140477 6/2008

* cited by examiner

*Primary Examiner* — Andrew L Sniezek
(74) *Attorney, Agent, or Firm* — Knobbe, Martens, Olson & Bear, LLP

(57) ABSTRACT

According to one embodiment, an information storage apparatus comprises a storage medium with a first servo pattern having absolute position information and a second servo pattern having relative position information, a pitch correction module configured to move a head with an initial feed pitch by using the second servo pattern by a target distance determined from the first servo pattern, and to correct the initial feed pitch based on a moving distance of the head and a target distance, a head position controller configured to position the head based on the initial feed pitch corrected by the pitch correction module and information of the first and the second servo patterns, and a recording signal generator configured to generate a control signal for making the head record the third servo pattern having the absolute position information.

7 Claims, 11 Drawing Sheets

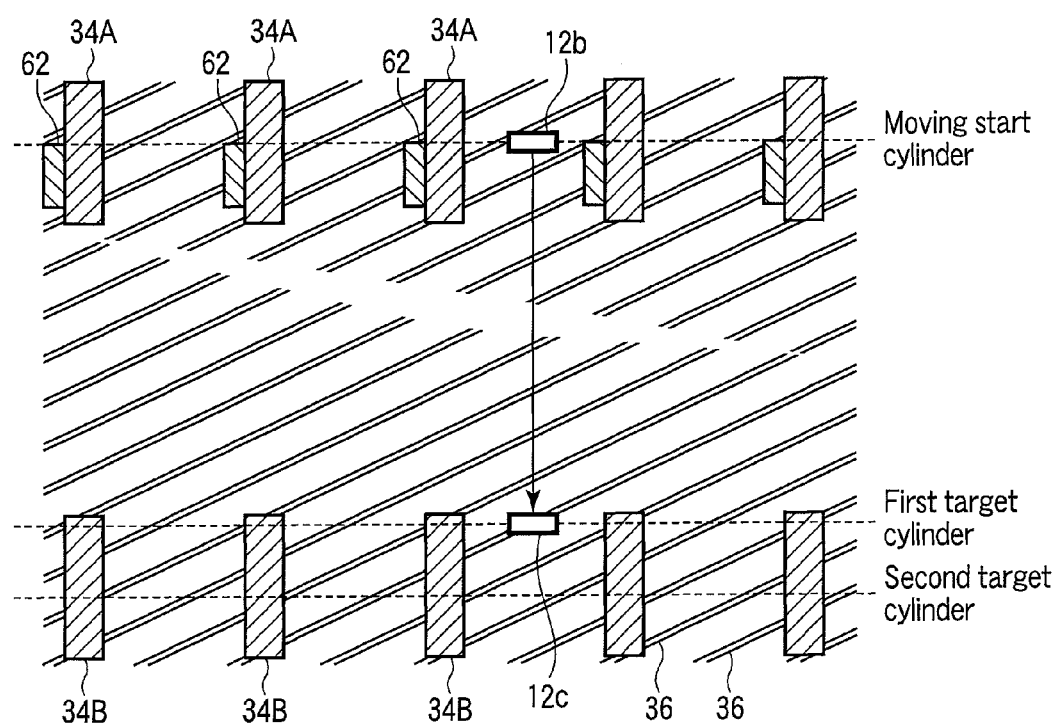
F I G. 7

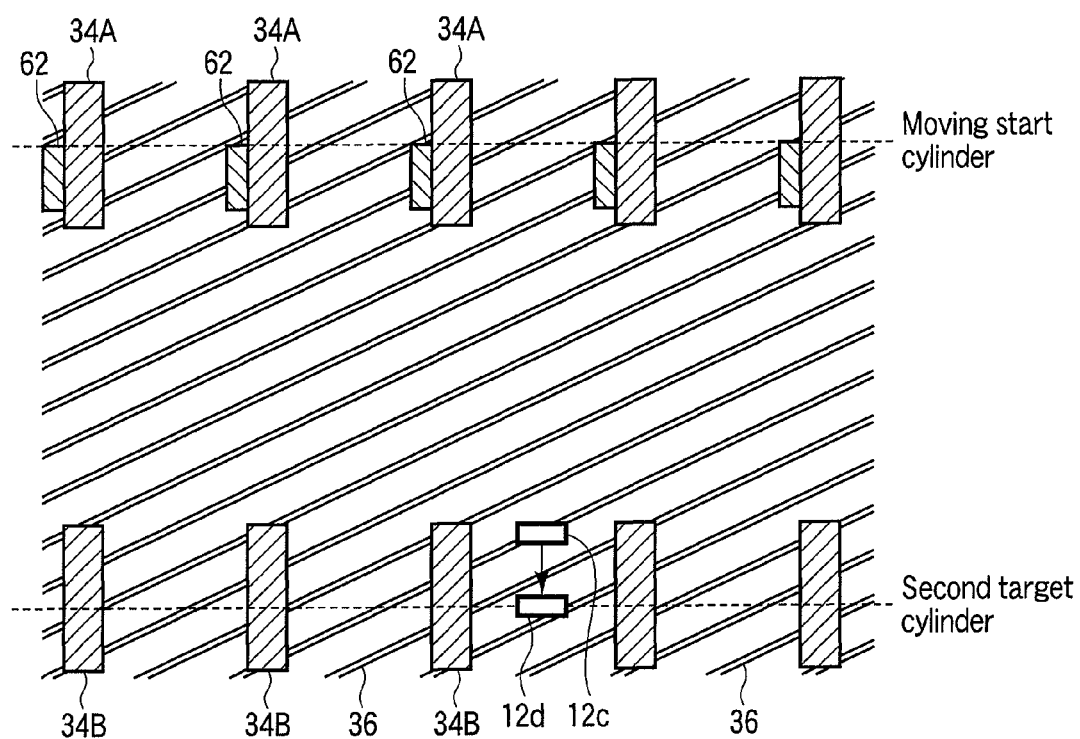
F I G. 10

INFORMATION STORAGE APPARATUS, METHOD FOR CORRECTING FEED PITCH OF READ/WRITE HEAD, AND METHOD FOR FORMING SERVO PATTERN

CROSS-REFERENCE TO RELATED APPLICATIONS

This application is based upon and claims the benefit of priority from Japanese Patent Application No. 2009-006859, filed Jan. 15, 2009, the entire contents of which are incorporated herein by reference.

BACKGROUND

1. Field

One embodiment of the invention relates to an information storage apparatus, a method for correcting a feed pitch of a read/write head, and a method for forming a servo pattern. More specifically, the one embodiment of the present invention relates to an information storage apparatus configured to form a new servo pattern by using a servo pattern previously existing on a recording medium and execute recording and reproducing based on the new servo pattern, a method for correcting a feed pitch of a read/write head, and a method for forming a servo pattern by using the method for correcting the feed pitch of the read/write head.

2. Description of the Related Art

A servo pattern to be used for positioning control of a read/write head configured to execute data reading/writing for a storage medium is formed on the storage medium such as a magnetic disk to be mounted on an information storage apparatus such as a magnetic disk apparatus. The read/write head is positioned on a target track on the storage medium based on the reading result of the servo pattern.

The servo pattern to be formed on the storage medium is generally formed in a radial pattern from the inner circumference portion toward the outer circumference portion of the storage medium. Regarding other servo patterns, a servo pattern with a spiral shape and a servo pattern having a concentric servo pattern connecting to the servo pattern with the spiral shape is proposed (e.g., Jpn. Patent Appln. KOKAI Publication No. 61-59671).

The formation of the servo pattern on the storage medium is executed by an external servo track writer (STW). However, if the external servo track writer writes the servo pattern on the entire surface of the storage medium, since the writing of the servo pattern on the storage medium requires a long time, one external servo track writer is occupied for a long time period. Depending on the reason given above, since it is needed to increase the external servo track writer, there is the possibility of an increase in cost of an investment in facilities.

Conversely, in recent years, to reduce the cost of the investment in facilities for the external servo track writer, a method for magnetically writing the servo pattern within an information storage apparatus on which the storage medium is mounted is proposed (e.g., see U.S. Pat. No. 7,145,744 B1 and No. 5,668,679). In this method, the read/write head in the information recording apparatus forms the spiral servo pattern having the spiral shape, and forms the servo pattern in a radial pattern by using the spiral servo pattern.

Recently, various examinations related to practical realization of the method for forming the servo pattern with reference to the servo pattern having the spiral shape. This method forms, in advance, a first servo pattern including absolute position information at a portion of a storage medium, and also forms, in advance, a second servo pattern including relative position information on the entire surface of the storage medium, and forms a third servo pattern including the absolute position information on the entire surface of the storage medium by using the first and second servo patterns after mounting the storage medium in the magnetic storage apparatus.

However, various problems such as an accuracy problem and a cost problem have newly posed.

For instance, in a formation process (by an external STW) of the second servo pattern (spiral pattern), in a case where the feed speed in a radius direction of the head configured to form the second servo pattern is fast, its track pitch is made wide. In this case, even if the third pattern of the number of desired cylinders is tried to be written, there is the possibility that the read/write head reaches the outer circumference or the inner circumference of the recording medium before the third servo patterns of all the number of cylinders have been written. Conversely, in the formation process of the second servo pattern, in a case where the feed speed in the radius direction of the head is slow, its track pitch is made narrow. In this case, when the third servo patterns of the number of the desired cylinders have been written, there is the possibility that the servo pattern is not written in the outer circumference area or the inner circumference area of the recording medium and areas are left.

To cope with such a phenomenon, a method for estimating the gradient of a spiral servo pattern by using amplitude information of the spiral servo pattern to adjust a feed track pitch amount is disclosed in Jpn. Pat. Appln. KOKAI Publication No. 2008-140477. However, in the method disclosed in Jpn. Pat. Appln. KOKAI Publication No. 2008-140477, there is the possibility that it is impossible to eliminate the influence of variation of writing core width of the head to be used in formation of the spiral servo pattern, and influence of variation of reading core width of the head to be used in reading of the spiral servo pattern.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 7 is an exemplary view depicting a state in which a magnetic disk is flawed.

FIG. 10 is exemplary view (a second) for explaining a method for correcting an initial feed pitch.

DETAILED DESCRIPTION

Various embodiments according to the invention will be described hereinafter with reference to the accompanying drawings. In general, according to one embodiment of the invention, an information storage apparatus comprises a storage medium on which a first servo pattern having absolute position information and a second servo pattern having relative position information are recorded; a head configured to record and reproduce information on and from the storage medium; a pitch correction module configured to move the head with an initial feed pitch by using the second servo pattern by a target distance which is a predetermined distance in a radius direction on the storage medium which is determined from the first servo pattern, and to correct the initial feed pitch based on a moving distance of the head and the target distance; a head position controller configured to position the head based on the initial feed pitch corrected by the pitch correction module and information of the first and the second servo patterns; and a recording signal generator configured to generate a control signal for making the head record a third servo pattern having the absolute position information while the head position controller positions the head.

Hereinafter, one embodiment of an information storage apparatus, a method for correcting a feed pitch of a read/write head, and a method for forming a servo pattern will be described in detail with reference to FIGS. 1-12.

Figure 1:
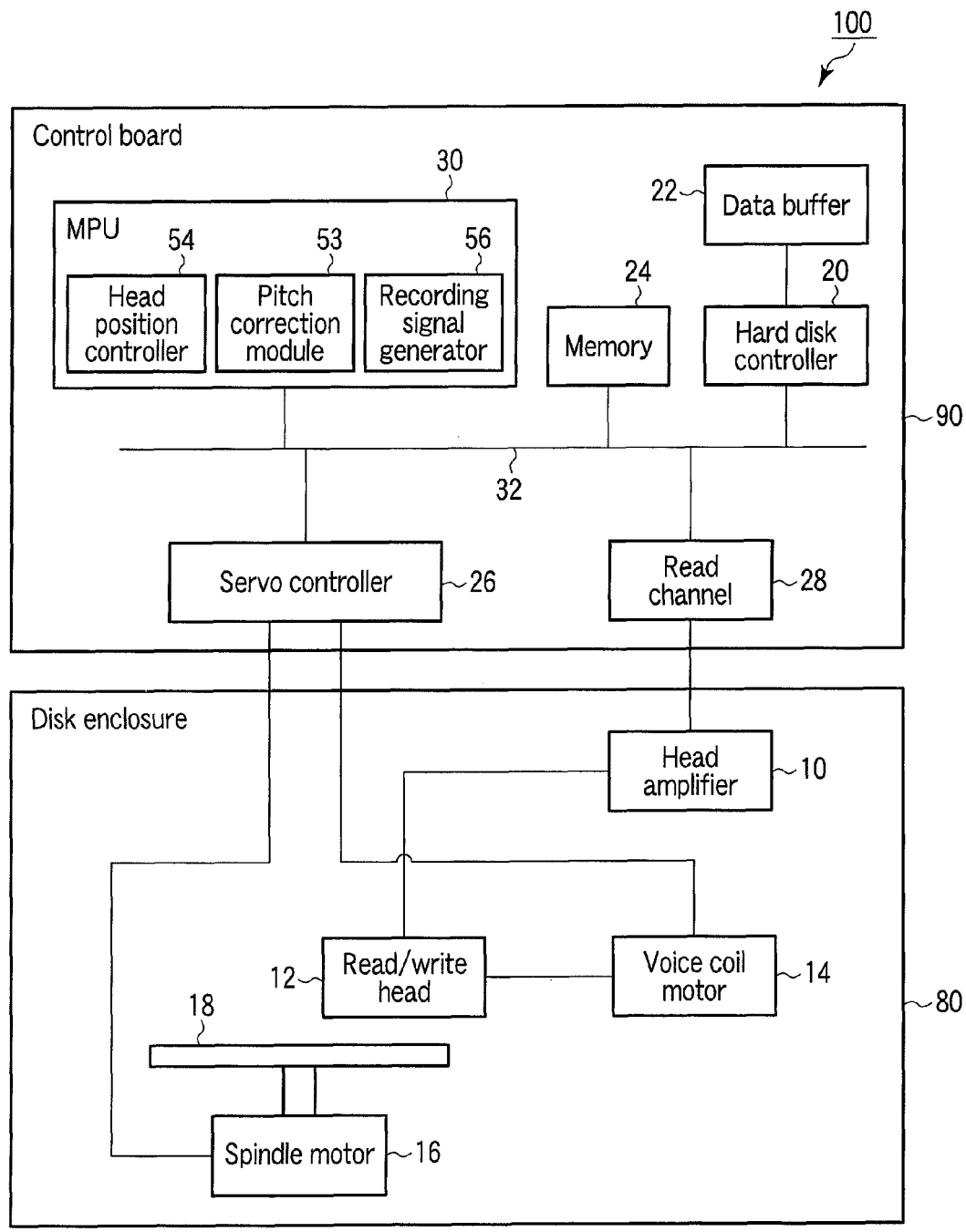
FIG. 1 is an exemplary block diagram schematically depicting a configuration of a magnetic disk apparatus of an embodiment of the invention.

FIG. 1 shows a block diagram of a magnetic disk apparatus 100 as an embodiment of the information storage apparatus of the embodiment. As shown in FIG. 1, the disk device 100 comprises a disk enclosure 80 and a control board 90.

The enclosure 80 comprises a head amplifier 10, a read/write head 12, a voice coil motor 14, a spindle motor 16, and a magnetic disk 18 as a storage medium.

The head amplifier 10 transmits data input from a read channel 28 to the read/write head 12 (as recording element), and also transmits the data read by the read/write head 12 (as reproducing element) to the read channel 28.

The read/write head 12 comprises a main unit made of ceramic, etc., a recording element built in the main unit to write information (data) on the magnetic disk 18, and a reproducing element for reading the written data.

The voice coil motor 14 drives a head stack assembly (HAS) holding the read/write head 12 under the control by a servo controller 26, and positions the read/write head 12 at a desired position on the magnetic disk 18. Under the control by the servo controller 26, the spindle motor 16 rotates the magnetic disk 18 at an appropriate rotation speed such as 4,200 to 15,000 rpm.

The magnetic disk 18 is a storage medium recording data thereon by varying a magnetized state of a magnetic body. On the magnetic disk 18, a servo pattern area to be used for positioning the read/write head 12, other than an area storing user data therein, is formed. Here, the magnetic disk 18 before being mounted on the enclosure 80, and immediately after being mounted thereon has a servo pattern shown in FIG. 2. More specifically, in an area adjacent to the outer circumference portions of a disk substrate 190 as a storage medium main body, the magnetic disk 18 comprises a first outer circumference servo pattern formed of servo sectors 34A arranged on an outer circumference side at predetermined intervals along with a circumferential direction, a first inner circumference servo pattern formed of servo sectors 34B arranged on an inner circumference side at predetermined intervals along with a circumferential direction, and a spiral-shaped second servo pattern 36 arranged on the entire surface of the disk substrate 190.

In the embodiment, while the magnetic disk 18 records a third servo pattern including absolute position information on the entire surface of the magnetic disk 18 after the magnetic disk 18 is mounted on the disk device 100, the first and the second servo sectors 34A and 34B and 36 are used for positioning the read/write head 12 for the recording. These first and the second servo patterns 34 and 36 are formed in advance by the external servo track writer (see FIG. 4).

Figure 3:
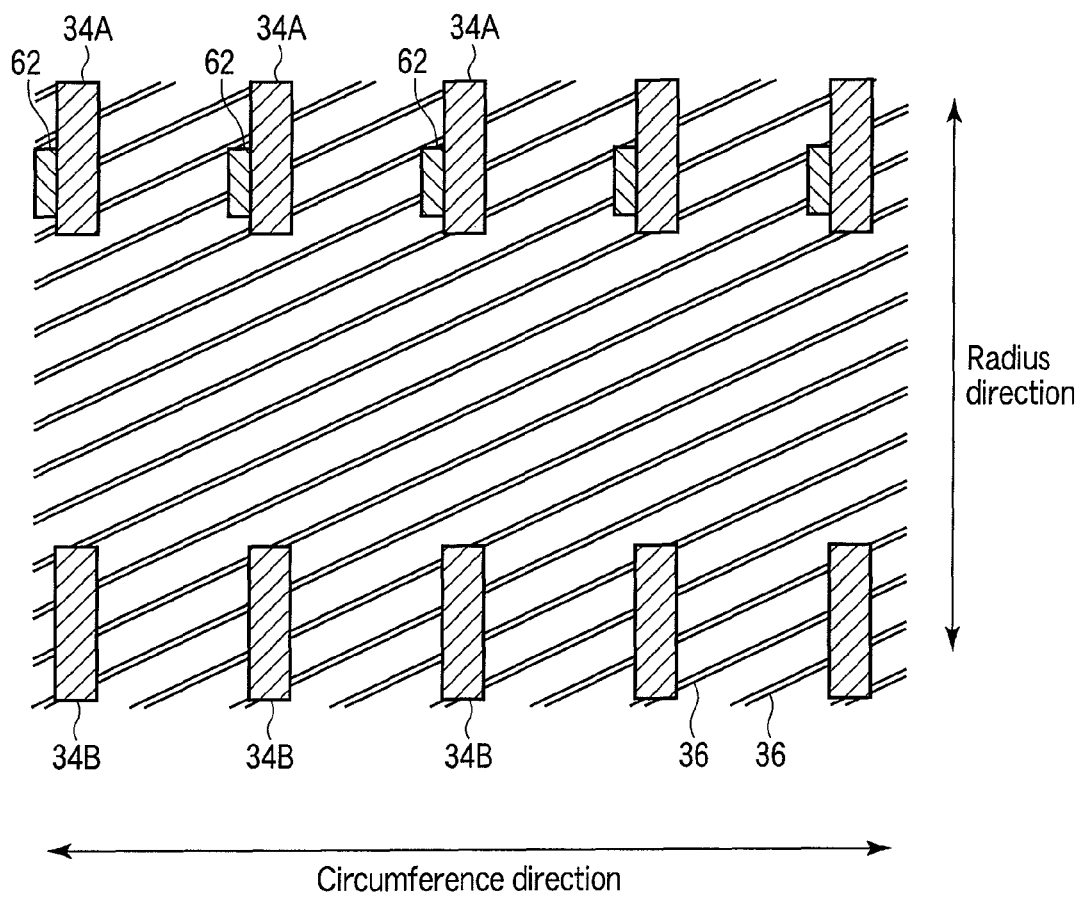
FIG. 3 is an exemplary view depicting an expanded area on an outer circumference portion of the magnetic disk in FIG. 2.

FIG. 3 shows a state of expansion of a part of the magnetic disk 18. As shown in FIG. 3, first servo sectors 34A and 34B extend in the radius direction of the magnetic disk 18. That is, the first servo sectors 34A and 34B are arranged in a radial pattern from the outer circumference portion or the inner circumference portion of the magnetic disk 18.

Practically, the first servo sectors 34A and 34B each comprise preambles, servo sync marks, sector data, gray codes and phase bursts. In this way, since in the embodiment, the first servo sectors 34A and 34B each comprise gray codes, etc., the read/write head 12 reads the first servo sectors 34A and 34B. Therefore, the embodiment can specify the absolute position on the magnetic disk 18. That is, it is possible for the first servo sectors 34A and 34B to be considered to each comprise absolute position information on the magnetic disk 18.

The second servo pattern 36 is a pattern having a spiral shape, and is brought into a state that the second servo pattern 36 intersects with the first servo sectors 34A and 34B. The second servo pattern 36 comprises the sync mark and the burst. Among of them, the sync mark is used as reference timing information in a circumference direction. The burst indicates the position of the second servo pattern 36 in accordance with its amplitude peak position timing. In this way, since in the embodiment, the second servo pattern 36 does not comprise the gray code, etc., even if the second servo pattern is read, it is impossible to specify the absolute position on the magnetic disk 18. It is possible to specify only the relative position thereon. That is, it is possible for the second servo pattern 36 to be considered to comprise relative position information on the magnetic disk 18.

Figure 2:
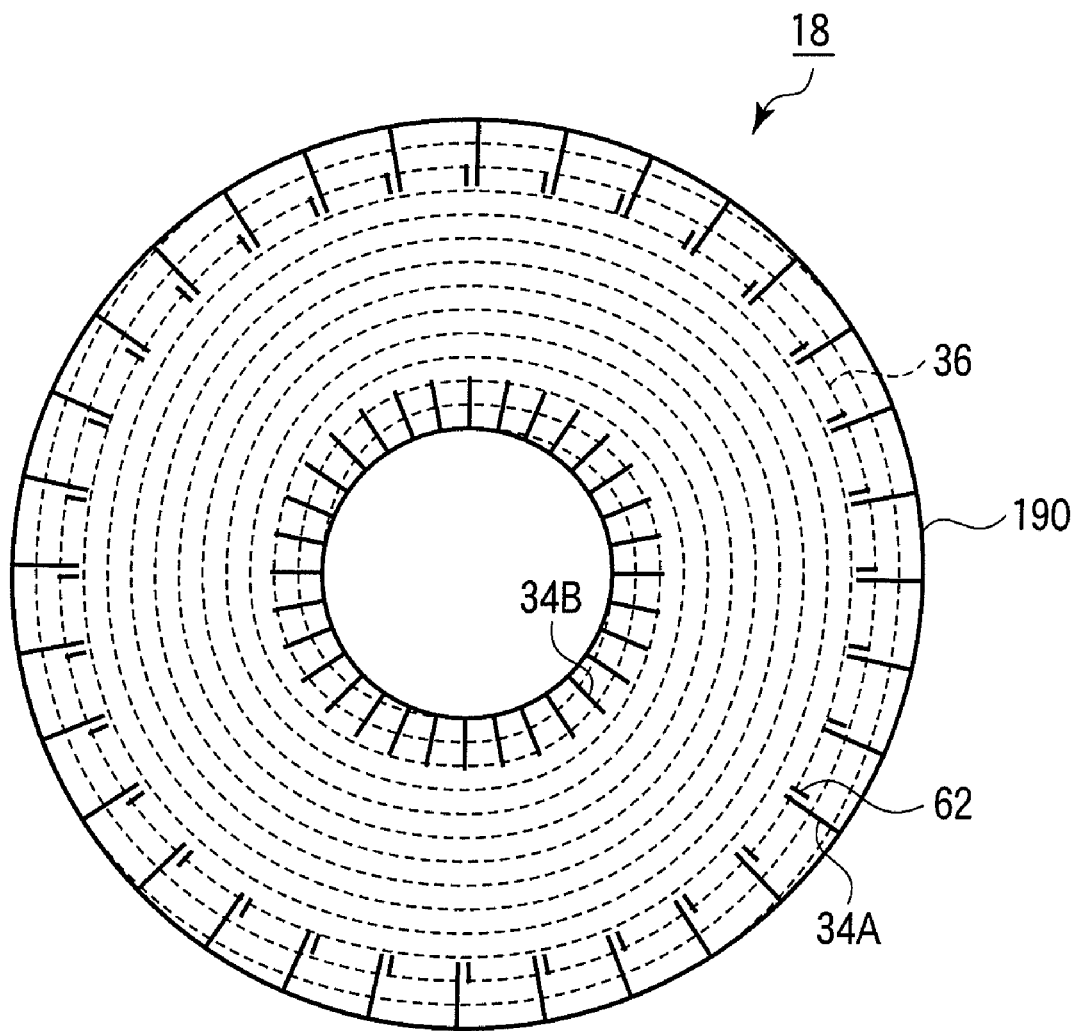
FIG. 2 is an exemplary plane view depicting a magnetic disk (a magnetic disk before or right after mounting onto the magnetic disk apparatus) in FIG. 1.

As shown in FIGS. 2, 3, system areas 62 are arranged at the positions adjacent to the first servo sectors (outer circumference side) 34A. Information of a reference position when a third servo pattern given below is recorded, schedule data, values of initial feed pitches for performing position control based on the second servo pattern 36 are stored in the system areas 62.

Returning now to FIG. 1, the control board 90 comprises a hard disk controller 20, a data buffer 22, a memory 24 as a storage unit, a servo controller 26, a read channel 28, and a micro processing unit (MPU) 30. Among of them, the hard disk controller 20, the memory 24, the servo controller 26, the read channel 28 and the MPU 30 are mutually connected through a system bus 32.

The hard disk controller 20 transmits and receives various commands and a variety of items of data to and from a host system (not shown) such as a computer that is the host of the magnetic disk apparatus 100. The data buffer 22 temporarily stores the data, etc., from the host system.

The memory 24 comprises a volatile memory such as a random access memory (RAM) and a nonvolatile memory such as a flash memory. The RAM is a work memory for use in execution of control processing by the MPU 30. The flash memory may store information about a reference position for recording a third pattern and schedule data instead of the system areas 62 on the aforementioned magnetic disk 18.

The servo controller 26 controls the drives of the voice coil motor 14 and the spindle motor 16 based on the instruction from the MPU 30.

The read channel 28 functions as a write modulation unit and a read demodulation unit. The MPU 30 integrally controls the entire of the magnetic disk apparatus 100.

The MPU 30 comprises a pitch correction module 53, a head position controller 54, and a recording signal generator 56, as shown in FIG. 1. The head position controller 54 performs positioning control of the read/write head 12 at the desired position on the magnetic disk 18. The pitch correction module 53 corrects initial feed pitch data stored in the system areas 62, as described later. The recording signal generator 56 generates a recording signal for making the magnetic disk 18 at the target position record the third servo pattern having the absolute position information by using the read/write head 12 performed the positioning control at the target position.

Next, processing from correction of the initial feed pitch up to formation of the third servo pattern will be described in detail with reference to flowcharts of FIGS. 4 and 11.

Figure 5:
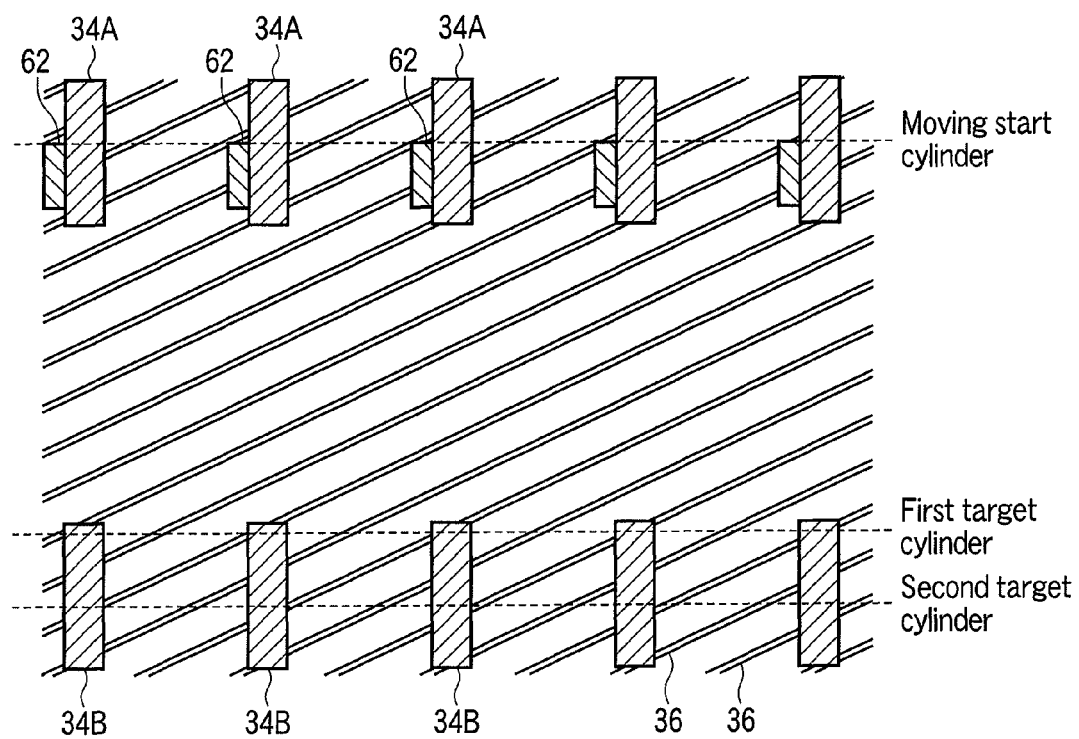
FIG. 5 is an exemplary view for explaining a moving start cylinder, a first target cylinder, and a second target cylinder.
Figure 6A:
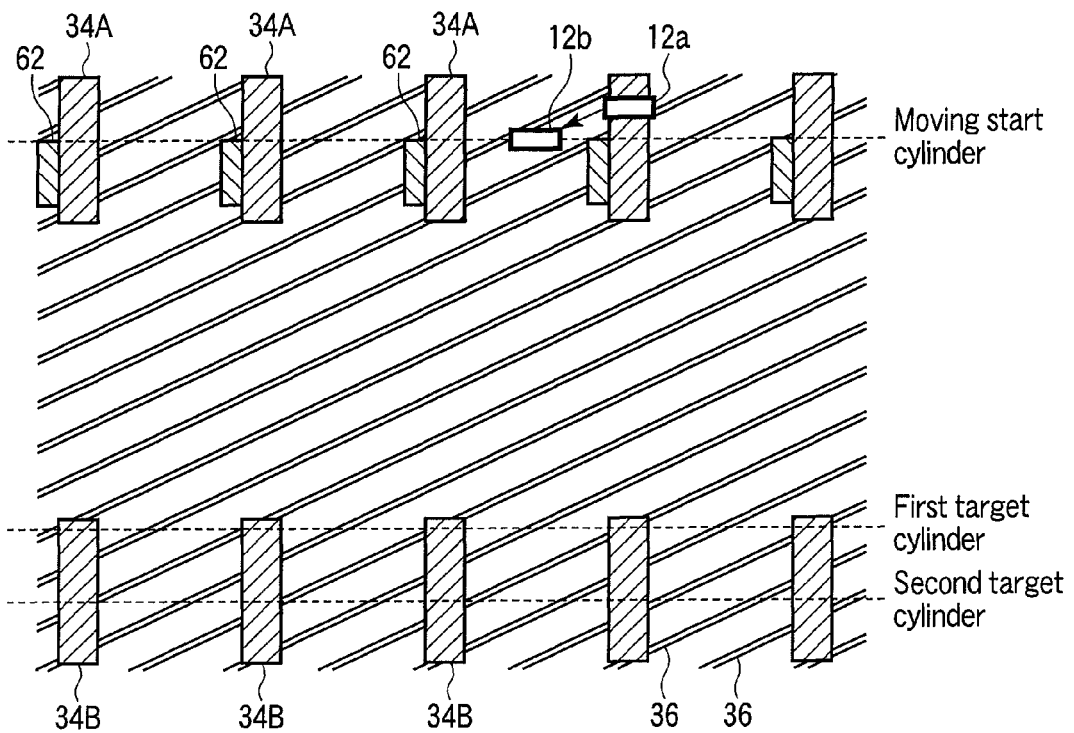
FIGS. 6A and 6B are exemplary views for explaining a method for correcting an initial pitch.
Figure 6B:
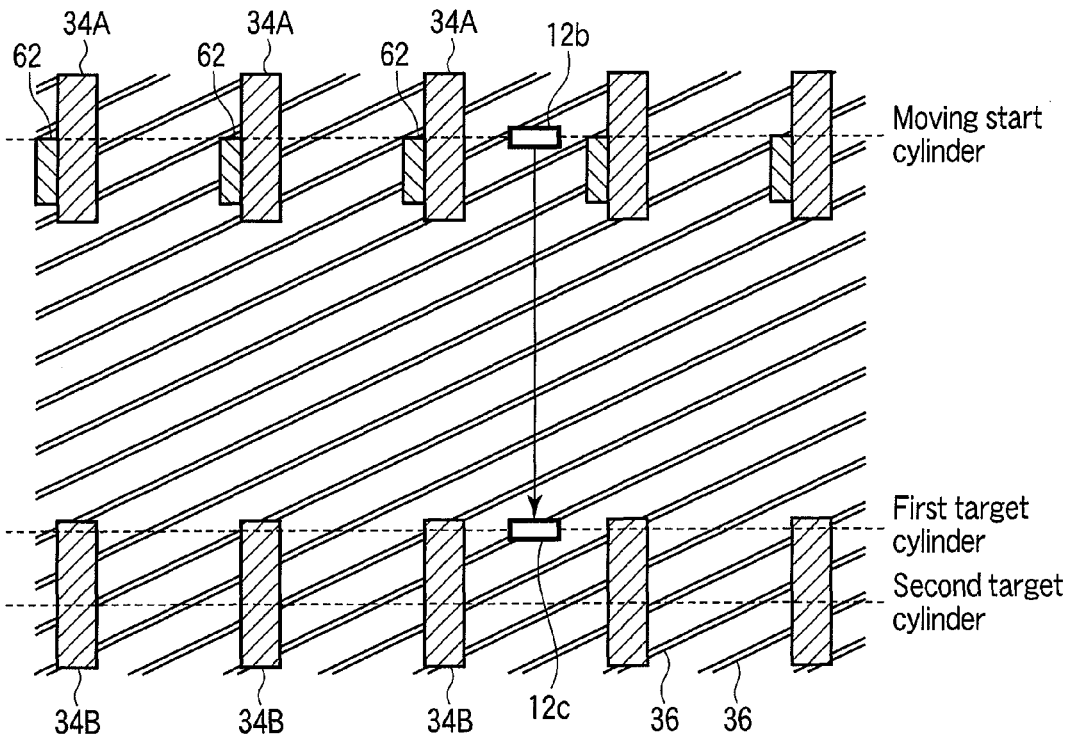

On the premise of the processing, the pitch correction module 53 sets a moving start cylinder, a first target cylinder, and a second target cylinder as shown in FIG. 5. Among of the cylinders, it is possible for the position of the moving start cylinder to be detected by making the read/write head 12 on-track to the first servo sectors (outer circumference side) 34A, and it is possible for the positions of the first and the second target cylinders to be detected by making the read/write head 12 on-track to the first servo sectors (inner circumference side) 34B. The distance (the number of cylinders) between the moving start cylinder and the first target cylinder, and the distance (the number of cylinders) between the first target cylinder and the second target cylinder are previously calculated based on, for example, the information stored in the system areas 62.

Figure 4:
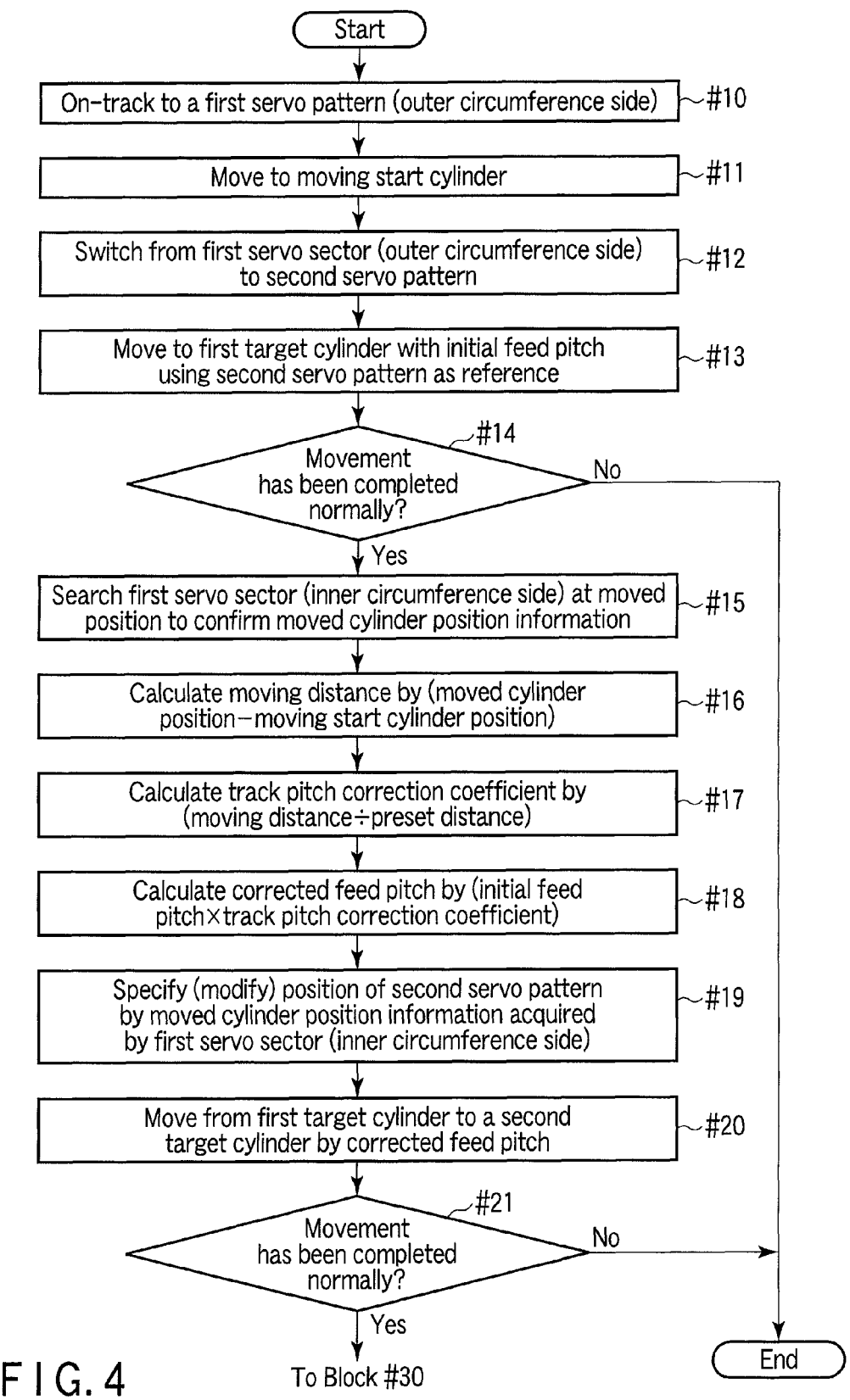
FIG. 4 is an exemplary flowchart depicting processing from a correction of an initial feed pitch up to formation of third servo patterns.

In block #10 of FIG. 4, the pitch correction module 53 on-tracks the read/write head 12 to the first servo sectors (outer circumference side) 34A (e.g., the position of the symbol "12a" of FIG. &A). Next, in block #11, the pitch correction module 53 moves the read/write head 12 to the moving start cylinder (the position of the symbol "12b" of FIG. 6A) based on the detection result of the first servo sectors (outer circumference side) 34A.

The pitch correction module 53, in block #12, in a state where the read/write head 12 positions at the moving start cylinder, switches the positioning control of the read/write head 12 from the positioning control using the first servo sectors (outer circumference side) 34A to the positioning control using the second servo pattern 36.

The pitch correction module 53, in block #13, moves the read/write head 12 to the first target cylinder (the position of the symbol "12c" in FIG. 6B) based on the second servo pattern 36 by using the initial feed pitch.

In block #14, the pitch correction module 53 determines whether or not the movement has been performed normally. Here, the case where the moving has not been performed normally, means, for example, the case where the state not capable of detecting the second servo pattern 36 due to the existence of a flaw or dust on the magnetic disk 18 has occurred, as shown in FIG. 7. If the determination is not affirmative here, an entire process is terminated as it is; however if the determination is affirmative, the process shifts to block #15.

Figure 8A:
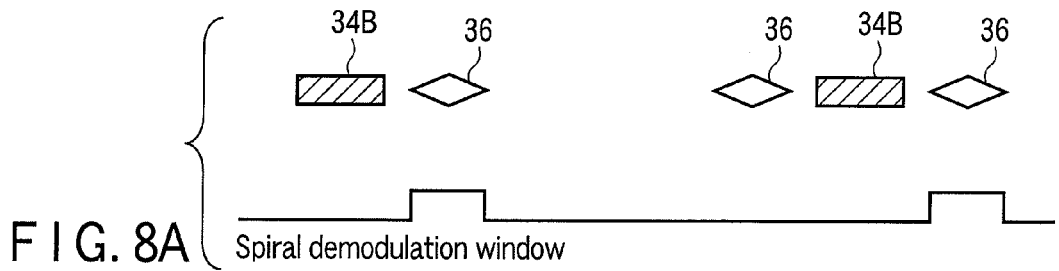
FIGS. 8A and 8B are exemplary views for explaining a search method of first servo patterns (inner circumference side).
Figure 8B:
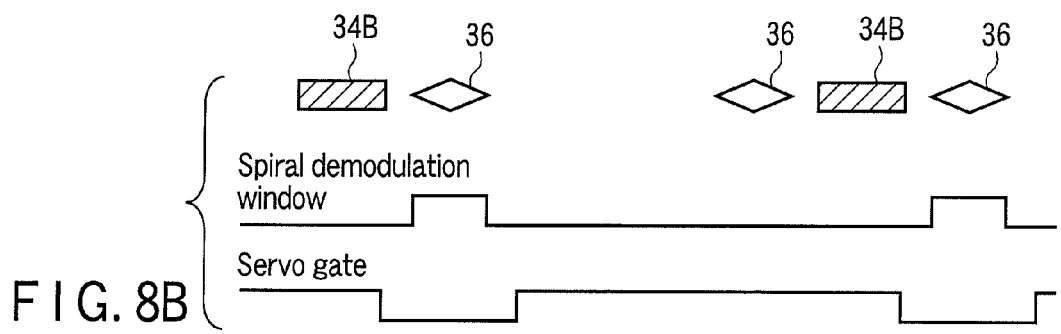

In block #15, the pitch correction module 53 searches the first servo sectors (inner circumference side) 34B at the position (radius direction position) after moved at block #13, and detects the position information (the value of cylinder position) of the cylinder after moved. Here, during movement from the moving start cylinder to the first target cylinder, the pitch correction module 53 opens a spiral demodulation window to detect the second servo pattern 36 as shown in FIG. 8A. Meanwhile, for detecting the first servo sectors (inner circumference side) 34B of block #15, the pitch correction module 53 opens the servo gate other than the period in which the spiral demodulation window is opened as shown in FIG. 8B, and detects to demodulate the second servo pattern 36.

In block #16, the pitch correction module 53 uses the value of the moving start cylinder position and the value of the after movement cylinder position to calculate the moving distance by the following equation (1).

Moving distance=After movement cylinder position−Moving start cylinder position      Eq. 1

For instance, if the value of the moving start cylinder is equivalent to 1,000 and the value of the after movement cylinder is equivalent to 102,000, the value of the moving distance of the cylinder becomes 101,000.

In block #17, the pitch correction module 53 calculates a track pitch correction coefficient by the following equation (2).

Track pitch correction coefficient=Moving distance÷Predetermined distance      Eq. 2

Here, if the value of the moving start cylinder is equivalent to 1,000 as given above, and the value of the first target cylinder is equivalent to 101,000, the predetermined distance becomes equivalent to 100,000. Therefore, in this case, the track pitch correction coefficient becomes equal to 101,000/100,000=1.01 by the equation (2).

In block #18, the pitch correction module 53 calculates the corrected feed pitch by the following equation (3).

Corrected feed pitch=Initial feed pitch×Track pitch correction coefficient      Eq. 3

For instance, if the track pitch correction coefficient is equal to 1.01, the corrected feed pitch is set to 1.01 times of the initial feed pitch.

Figure 9:
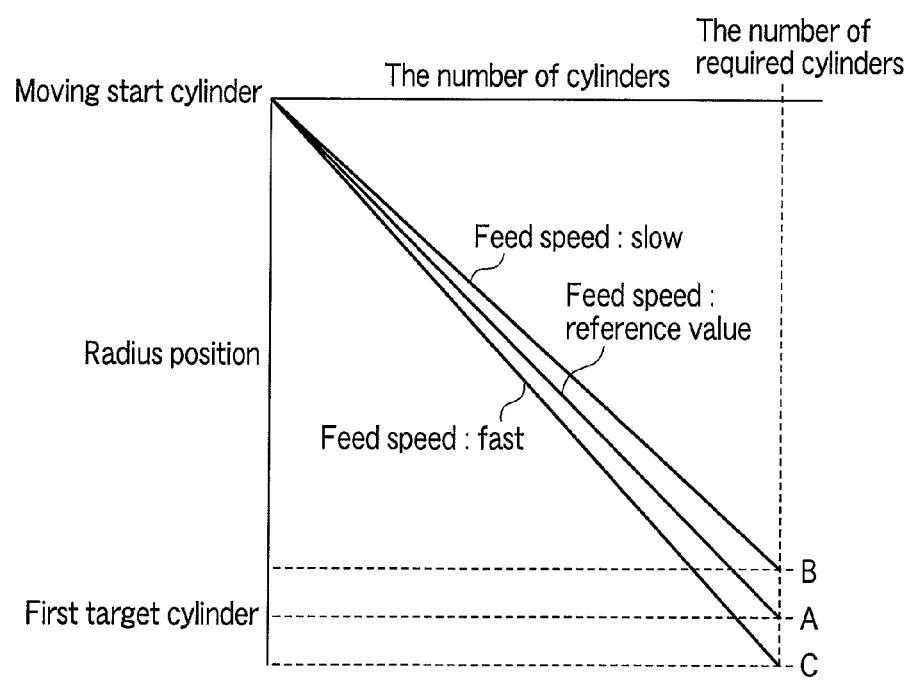
FIG. 9 is an exemplary view depicting an influence of a difference in a head feed speed of an external STW facility.

Here, as shown in FIG. 9, if the head feed speed, when the second servo pattern 36 is formed by the external servo track writer, is equivalent to a reference value, the read/write head 12 reaches the first target cylinder (see point A of FIG. 9) after a feeding of a predetermined number of cylinders. However, if the head feed speed of the external servo track writer is slow, since the width of the second servo pattern 36 becomes narrow, even if the read/write head 12 is fed for the predetermined number of cylinders at the initial feed pitch, the read/write head 12 does not reach the first target cylinder (see point B of FIG. 9). If the head feed speed of the external servo track writer is fast, since the width of the second servo pattern 36 becomes wide, when the read/write head 12 is fed for the predetermined number of cylinders at the initial feed pitch, the read/write head 12 exceeds the first target cylinder (see point C of FIG. 9). Therefore, the read/write head 12 can be always moved in the same manner as the case when the feed speed is equivalent to the reference value by correcting the feed pitch by the equation (3).

Returning to FIG. 4, in the next block #19, the pitch correction module 53 specifies (modifies) the position of the second servo pattern by using the cylinder information after movement acquired from the first servo sector (inner circumference side) 34B.

In block #20, the pitch correction module 53 moves the read/write head 12 up to the second target cylinder by the corrected feed pitch (see symbol "12d" of FIG. 10). The moving distance here is referred to as a "test target distance". And after this movement, the pitch correction module 53 searches the first servo sector (inner circumference side) 34B to detect the position information (value of cylinder position 1) of the cylinder after movement.

Next, in block #21, the pitch correction module 53 determines whether or not the movement has been performed normally. Here, the pitch correction module 53 determines whether or not the movement has performed normally by determining whether or not the difference between the second target cylinder and the cylinder after movement is within a range of a predetermined threshold, namely, by determining whether or not the moving distance reaches almost by the "test target distance". If the determination in block #21 is not affirmative, since the feed pitch has not been corrected, the pitch correction module 53 does not continue the process more than this to terminate the entire process. Conversely, if the determination in block #21 is affirmative, the pitch correction module 53 shifts to the processing in FIG. 11.

Figure 11:
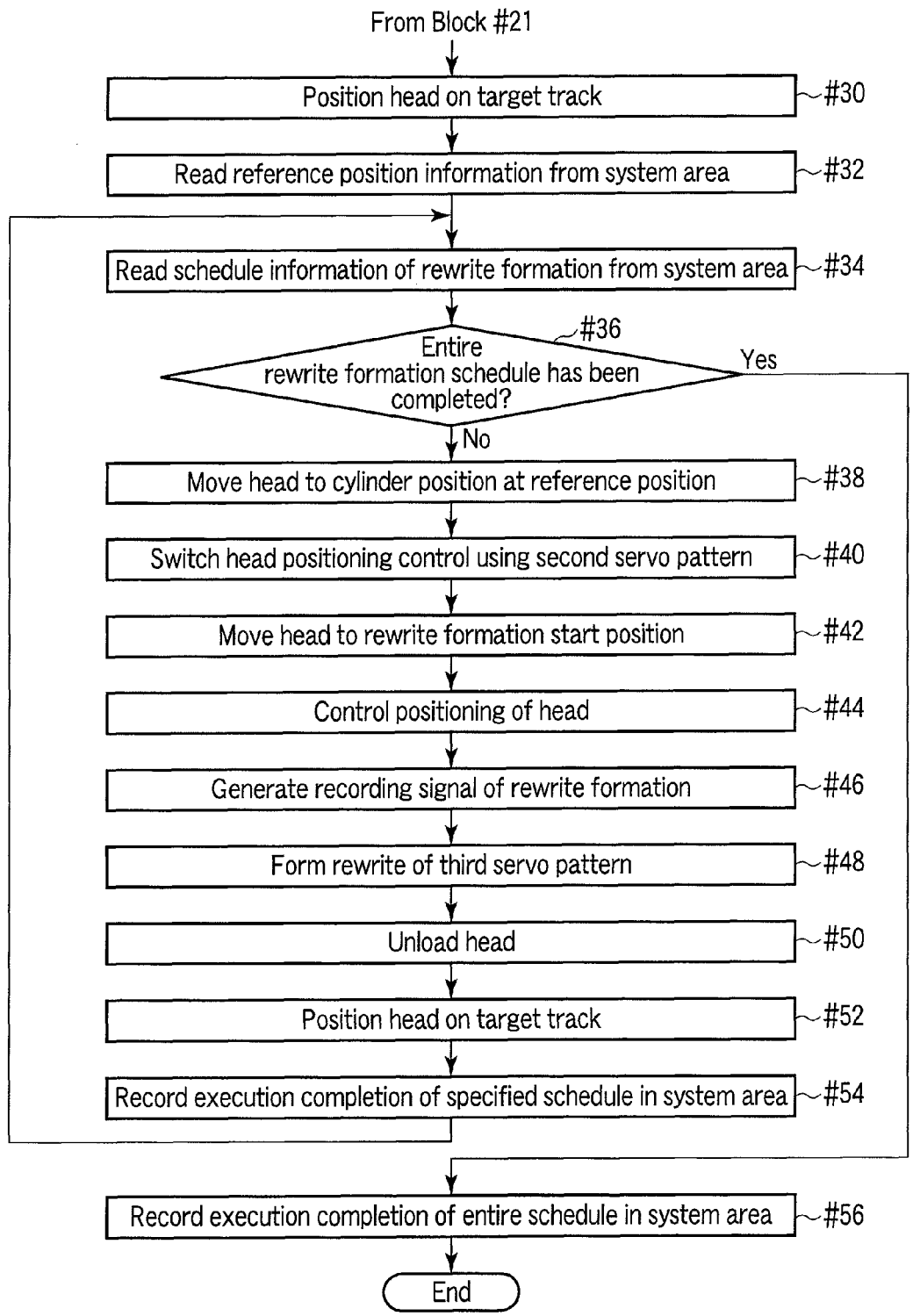
FIG. 11 is an exemplary flowchart (a second) depicting processing from a correction of an initial feed pitch up to formation of the third servo patterns.

The processing in FIG. 11 forms (rewrite-forms) the third servo pattern having the absolute position information on the magnetic disk 18.

Figure 12:
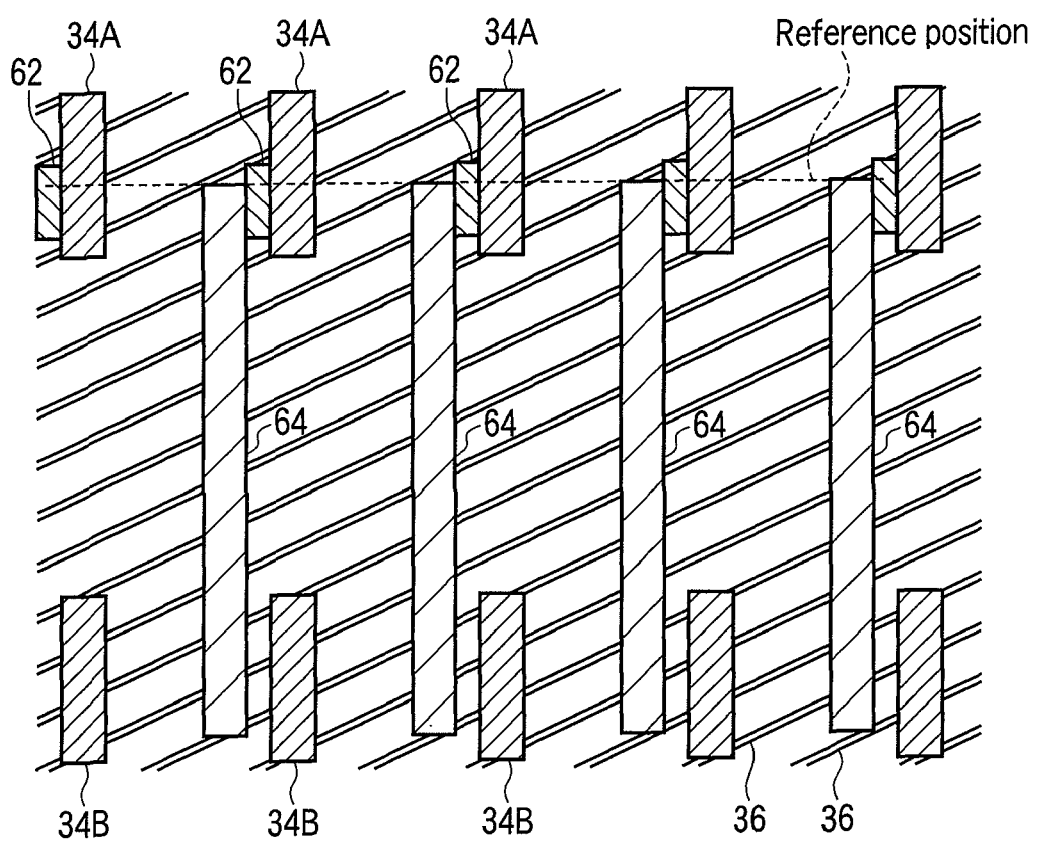
FIG. 12 is an exemplary view for explaining a method for forming the third servo patterns.

As premise for execution of processing in FIG. 11, the MPU 30 has previously detected the reference position (position starting the formation of the third servo pattern, see FIG. 12), and the detection result (the information related to the reference position) has been stored in the system areas 62. The reference position may be or may not be the moving start cylinder shown in FIG. 10. The information (schedule data) such as the number of times of rewriting needed to be executed for forming the third servo pattern and the cylinder position at each rewriting, etc., and the values of the corrected feed pitch are stored in the system areas 62. The embodiment will describe the case, as an example, where one time rewrite formation forms the third servo pattern formed of servo sectors 64 (see FIG. 12).

In block #30 of FIG. 11, the MPU 30 (head position controller 54) controls the drives of the spindle motor 16 and the voice coil motor 14 through the servo controller 26 to position the read/write head 12 on the target track within the first servo pattern formed of servo sectors 34A and 34B. In this case, the MPU 30 can position the read/write head 12 on the target track by using the information of the gray code and the phase burst of the servo sectors 34A and 34B.

In block #32, the MPU 30 reads the information (information of the cylinder position, etc.) stored in the system areas 62. In block #34, the MPU 30 reads the schedule data of the rewrite formation stored in the system areas 62.

In block #36, the MPU 30 determines whether or not the entire rewrite formation schedule has been completed. Here, since the rewrite formation has not completed yet, the determination is not affirmative, then, the MPU 30 proceeds to block #38. Next, in block #38, the MPU 30 (head position controller 54) controls the spindle motor 16 and the voice coil motor 14 through the servo controller 26 to move the read/write head 12 to the reference position read from the system areas 62 (see FIG. 3). In this movement, the MPU 30 (head position controller 54) uses the information of the gray codes and the phase bursts of the first servo sectors 34A and 34B.

In block #40, the MPU 30 switches the positioning control of the read/write head 12 from the positioning control using the first servo sectors 34A and 34B to the positioning control using the second servo pattern 36. In block #42, the MPU 30 (head position controller 54) moves the read/write head 12 to the rewrite formation start position based on the schedule data read from the system areas 62. In the embodiment, since the MPU 30 performs only one time rewrite formation, and the rewrite formation start position is set to the foregoing reference position, the movement of the read/write head 12 in block #42 is not executed. However, in block #42 in the processing after two times in a case in which the rewrite formation is performed in a plurality of times, the termination position neighborhood in the rewrite formation performed before the processing is set as a rewrite formation start position.

In block #44, the MPU 30 (head position controller 54) drives the spindle motor 16 and the voice coil motor 14 via the servo controller 26 based on the information of the cylinder position information in the rewrite formation schedule read from the system areas 62 to perform the position control of the read/write head 12. In this time, the positioning control of the read/write head 12 is performed by using the second servo pattern 36. In block #46, during the positioning control of the read/write head 12, the MPU 30 (recording signal generator 56) generates the recording signal for the rewrite formation of the third servo pattern 64. The recording signal for rewrite formation the third servo pattern 64 is transmitted to the read/write head 12 via the read channel 28. Thereby, as shown in FIG. 12, the third servo sectors 64 are formed at the positions deviating from the first servo sectors 34A and 34B and the system areas 62 in a circumference direction (block #48). When forming the third servo sectors 64 on the magnetic disk 18, the MPU 30 sequentially forms the third servo sectors 64 while moving the read/write head 12 (while moving by the corrected feed pitch) in a radius direction to the rotating magnetic disk 18.

Here, as mentioned above, the reference position of the second servo pattern 36 has the absolute position information. Therefore, the MPU 30 can perform the positioning control of the read/write head 12 while specifying the absolute position on the magnetic disk 18 by executing the positioning control of the read/write head 12 from the reference position of the second servo pattern 36, and by using the second servo pattern.

The MPU 30 (head position controller 54) stops the positioning control using the second servo pattern 36 to unload the read/write head 12 outside the magnetic disk 18 (block #50).

In block #52, the MPU 30 (head position controller 54) uses the information such as the gray codes and the phase bursts of the first servo sectors 34A and 34B again to position the read/write head 12 on the target track in the first servo sectors 34A and 34B. By reason of the necessity to switch the positioning control of the read/write head 12 from the second servo pattern 36 to the first servo sectors 34A and 34B, the read/write head 12 is unloaded once outside the magnetic disk 18 in the foregoing block #50.

In block #54, the MPU 30 records that the rewrite formation in the system areas 62 has been completed.

The MPU 30 reads the schedule data of the rewrite formation and the information of the completion of the rewrite formation from the system areas 62 (block #34) to determine whether or not the entire rewrite schedule has been completed (block #36). If the MPU 30 determines that the entire rewrite formation schedule has been completed based on the schedule data of the rewrite formation and the rewrite formation read from the system areas 62, the determination in block #36 is affirmative, and the process shifts to block #56.

In block #56, the MPU 30 records the completion of the entire rewrite formation in the system areas 62 to terminate the entire processing of FIG. 11.

As mentioned above, after the formation of the third servo pattern 64 on the magnetic disk 18, normal recording/reproducing processing can be executed on the magnetic disk 100. That is, in the magnetic disk device 100, since the positioning of the read/write head 12 using the third servo pattern formed of the servo sectors 64 can be performed, after this, using the third servo sectors 64 each having the absolute position information enables the read/write head 12 to position itself with high precision and further enables the read/write head 12 to record and reproduce with high precision.

As mentioned above in detail, according to the embodiment, since the pitch correction module 53 sets, as the target distance, the predetermined distance (distance between the moving start cylinder and the first target cylinder) related to the radius direction on the magnetic disk 18 determined by means of the first servo sectors 34A and 34B each having the absolute position information, moves the read/write head 12 by using the second servo pattern 36 having the absolute position information with the initial feed pitch, and corrects the initial feed pitch based on the moving distance and the target distance at this time. If the result caused by moving the distance accurately determined based on the first servo sectors 34A and 34B has deviated from the target distance; the correction of the initial feed pitch can be appropriately executed by correcting the initial feed pitch so as to correct the deviation. Since the recording signal generator 56 generates the control signal for recording the third servo pattern 64 on the magnetic disk 18 while the head position controller 54 moves the read/write head 12 on the basis the appropriately corrected initial feed pitch, and the information of the first and the second servo patterns, the third servo pattern 64 can be recorded on the magnetic disk 18 with high precision. Therefore, positioning the read/write head 12 by using the third servo pattern 64 recorded with high precision enables recording and reproducing the data on and from the magnetic disk 18 with high precision.

In the embodiment, during the execution of the correction processing by the pitch correction module 53, if there is a time point at which the second servo pattern 36 cannot detect by the read/write head 12 (if the determination in block #14 is not affirmative), the entire processing is terminated and the signal generation (i.e., processing in FIG. 11) for the recording processing of the third servo pattern is not performed. Therefore, if the flaw, the dust, etc., exist on the magnetic disk 18, and there is a high possibility to occur an error, stopping the rewrite formation of the third servo pattern 64 enables making work more efficient.

In the embodiment, after the pitch correction module 53 sets the test target distance and moves the read/write head 12 by the test target distance with the corrected feed pitch, it is determined whether or not the difference between the actual moving distance and the test target distance is equal to or smaller that the preset threshold (block #21 in FIG. 4), only if the difference is equal to or smaller than the threshold (only if the determination in block #21 is affirmative), the recording process (process in FIG. 11) of the third servo pattern is executed. Therefore, since the process is not continued if the possibility of the occurrence of the error becomes high, it is possible to make the work more efficient.

While the foregoing embodiment has described a case in which the moving start cylinder is determined based on the first servo sectors (outer circumference side) 34A, and determines the first and the second target cylinders based on the first servo sectors (inner circumference side) 34B, the invention is not limited to this embodiment. For instance, the first and second target cylinders may be determined based on the first servo sectors (outer circumference side) 34A, and the moving start cylinder may be determined based on the first sectors (inner circumference side) 34B. If the track pitch correction coefficient can be obtained only by the movement within either servo sectors 34A and 34B, the moving start cylinder and the first and the second target cylinders may be determined based on either the servo sectors 34A and 34B. In this case, only one of the first servo sectors (outer circumference side) 34A and the first servo sectors (inner circumference side) 34B may be arranged.

While the aforementioned embodiment has described a case that the system areas 62 are arranged on the outer circumference side of the magnetic disk 18, the invention is not limited to this case. The system areas 62 may be arranged on the inner circumference side of the magnetic disk 18. While the aforementioned embodiment has described a case where the third servo pattern 64 may be formed by setting the outer circumference side as a start point and the inner circumference side as a terminal point, the invention is not limited to this case. The third servo pattern 64 may be formed by setting the inner circumference as the start point and the outer circumference side as the termination point.

While the embodiment given above has described a case in which the one time rewrite formation forms the third servo pattern 64, the invention is not limited to this case. A plurality of times of rewrite formation may form the third servo pattern 64.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

According to the information storage apparatus described in the specification, the pitch correction module 53 sets, as the target distance, the predetermined distance related to the radius direction of the recording medium 18 determined from the first servo pattern 34 having the absolute position information, moves the read/write head 12 with the initial feed pitch by using the second servo pattern having the relative position information, and corrects the initial feed pitch based on the moving distance and the target distance at this time. Therefore, if the result, as the target distance, caused by moving the predetermined distance accurately determined from the first servo pattern has been deviated from the target distance, the appropriate correction of the initial feed pitch can be performed by correcting the initial feed pitch so as to correct the deviance. Since the recording signal generator 56 generates the control signal for recording the third servo pattern on the recording medium 18 while the head position controller 54 performs the positioning control of the read/write head 12 based on the appropriately corrected initial feed pitch, and the information about the first and the second servo patterns, the third servo pattern can be recorded with high procession on the recording medium 18. Therefore, performing the positioning control of the read/write head 12 by using the third pattern recorded with high-accuracy makes it possible to record and reproduce for the recording medium 18 with high accuracy.

According to the method for correcting the feed pitch of the read/write head described in the specification, the method sets the predetermined distance, as the target distance, related to the radius direction on the recording medium 18 determined from the first servo pattern 34 having the absolute position information, moves the read/write head 12 with the initial feed pitch by using the second servo pattern 34 having the relative position information, and corrects the initial feed pitch based on the moving distance and the target distance at this time. Therefore, if the result, as the target distance, caused by moving the predetermined distance accurately determined from the first servo pattern has been deviated from the target distance, the appropriate correction of the initial feed pitch can be performed by correcting the initial feed pitch so as to correct the deviance.

According to the method for forming the servo pattern described in the specification, since the third servo pattern having the absolute position information on the recording surface is recorded on the recording medium 18 while performing positioning control of the read/write head 12 by using the accurately corrected initial feed pitch and the information of the first and the second servo patterns, the third servo pattern can be highly and precisely recorded on the recording medium 18.

What is claimed is:

1. An information storage apparatus comprising:
    a storage medium configured to store a first servo pattern comprising absolute position information and a second servo pattern comprising relative position information;
    a head configured to record on the storage medium and to reproduce information from the storage medium;
    a track pitch correction module configured to move the head at an initial feed track pitch using the second servo pattern, by a target distance in a radius direction on the storage medium associated with the first servo pattern, and to correct the initial feed track pitch based on an actual distance of the head movement and the target distance;
    a head position controller configured to position the head based on the initial feed track pitch corrected by the pitch correction module and information of the first and the second servo patterns; and
    a recording signal generator configured to generate a control signal which causes the head to record a third servo pattern comprising the absolute position information while the head position controller is positioning the head.

2. The device of claim 1, wherein
    the pitch correction module is configured to set a start position and an end position of the head movement from the first servo pattern in order to set a distance between the start position and the end position as the target distance.

3. The device of claim 2, wherein
    first servo sectors are on an outer circumference side and second servo sectors are on an inner circumference side on the storage medium, each of the first and second servo sectors comprise a first servo pattern;
    the pitch correction module is configured to set the start position based on one first servo pattern of the first and second servo sectors and to set the end position based on the other first servo pattern of the first and second servo sectors.

4. The device of claim 1, wherein
    the recording signal generator is configured to stop generating the control signal if the second servo pattern is not detected during correction of the initial feed track pitch by the pitch correction module.

5. The device of claim 1, wherein
    the pitch correction module is configured to set a test target distance other than the target distance, and to determine whether a difference between the test target distance and an actual distance of the head movement after moving the head with the corrected initial feed pitch by the test target distance is shorter than a preset threshold; and
    the recording signal generator is configured to generate the control signal when the difference is shorter than the threshold.

6. A method for correcting a feed track pitch of a head comprising:
    setting a target distance in a radius direction on a storage medium based on a first servo pattern comprising absolute position;
    moving the head at an initial feed track pitch using a second servo pattern comprising relative position information by the target distance; and
    correcting the initial feed track pitch based on the target distance and an actual distance of the head movement.

7. A method for forming a servo pattern on a recording surface of a storage medium configured to store a first servo pattern comprising absolute position information and a second servo pattern comprising relative position information, the method comprising:
    correcting an initial feed track pitch based on a target distance in a radius direction on a storage medium based on the first servo pattern and an actual distance of the head movement; and
    positioning the head using the corrected initial feed track pitch and the absolute position information of the first servo pattern and the relative information of the second servo pattern, and recording a third servo pattern comprising the absolute position information on the recording surface.

* * * * *